No. 896,000. PATENTED AUG. 11, 1908.
J. B. FORSYTH.
RUBBER ROLL OR RING.
APPLICATION FILED JULY 3, 1905.
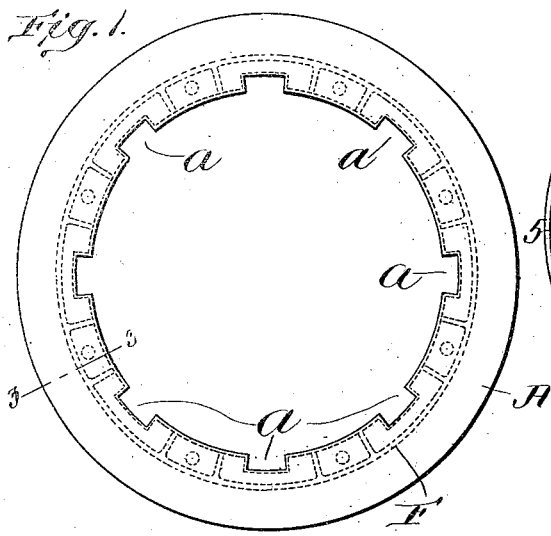
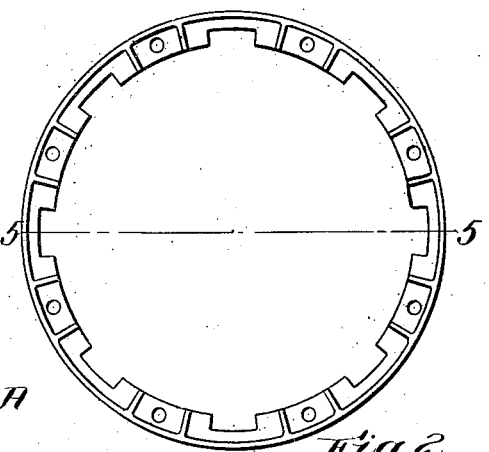
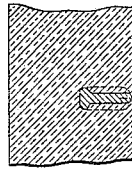
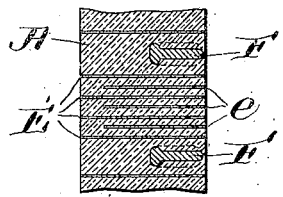
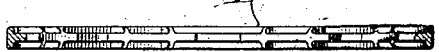
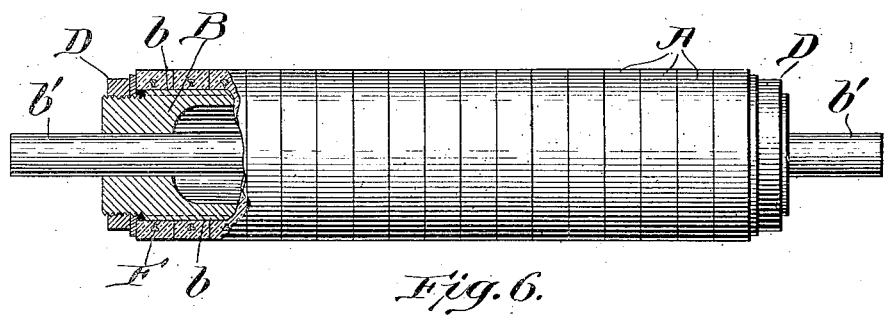
Witnesses:
Inventor:
James Bennett Forsyth
by George A. Rockwell
Attorney.

UNITED STATES PATENT OFFICE.

JAMES BENNETT FORSYTH, OF BOSTON, MASSACHUSETTS.

RUBBER ROLL OR RING.

No. 896,000.  Specification of Letters Patent.  Patented Aug. 11, 1908.

Application filed July 3, 1905. Serial No. 268,112.

*To all whom it may concern:*

Be it known that I, JAMES BENNETT FORSYTH, of Boston, county of Suffolk, in the State of Massachusetts, have invented a new and useful Rubber Roll or Ring, of which the following is a specification.

My invention relates primarily to sectional rollers which are usually made by putting a number of rings, or sections on to a metal body or shell, and securing them by pressure between end clamping rings of metal. These rings, or sections are usually made of rubber, or some such resilient material. In order that rings of rubber may possess solidity and strength enough to make a durable roller, it is necessary to harden or stiffen them by compounding and vulcanizing the rubber, as is well understood by rubber manufacturers. While such rollers answer well enough for moderate work, yet under heavy pressure they are not durable, as the sections, or rings, will stretch somewhat and work loose on the body, resulting in relative motion between the rings or sections and the body, and consequent deterioration and inefficiency of the roller. This is especially true when the roller is soft and elastic as in such cases it is not possible to compound and vulcanize the rubber rings to be firm enough to possess the required strength and still retain the elasticity desired.

In the roller described by me in my Patent No. 732728 of July 7th., 1903, duck is used to reinforce the rubber rings, and lessen the tendency of the rings to stretch, and the rubber on the inside is harder than on the outside for the same purpose. Other ways of reinforcing the rubber have been used but they are objectionable for several reasons. For example, if each rubber ring is vulcanized on to a metal hub as a tire, and the hubs, with their rubber coverings are then assembled on a shaft, and pressed between end clamping rings, the fit of the sections or rings on the shaft is iron to iron, which is an unfortunate arrangement, because all such rollers should be interchangeable, as to their parts, and a little wear or a little rust inside of the metal part may mean difficulty in assembling the parts, or taking the roller apart, or may mean that the sections when put on the shaft will be loose and make a roller which is rickety. This is still further a disadvantage, because these metal hubs must carry keys to prevent their turning on the shaft, which further complicates the difficulties, and such metal rings are liable to rust in place, so they can only be removed with difficulty.

In all the above methods, if a roller is constructed to be soft and very resilient, the rubber rings will stretch more or less when the roller is subjected to heavy service, such as squeezing thick uneven masses, under heavy pressure, and will get loose on the core, resulting in the short life and usefulness of the roller.

The object of my invention is to overcome these difficulties and disadvantages by so reinforcing the rings of a sectional roller with pieces of metal, hard rubber, hard fiber or other suitable material, that while they can be made soft and resilient, yet they will be so strong on the inside next to the iron body that the tendency of the rings to stretch, and get loose on the body will be practically done away with, and at the same time the simplicity of construction and the small number of parts, which is a characteristic of my roller, as described in my above mentioned patent, is retained, and this is an important feature since it may be desirable to take apart such rollers and put them together occasionally to repair the injury to the covering, due to the wear and tear of service, and my invention consists in a section of a sectional rubber covered roll comprising a rubber ring reinforced by metal, hard rubber or the like, inserted in the rubber ring at its inner portion and made T-shaped in cross section to give a broad bearing surface at the outside and rubber-engaging shoulders at the inside.

In the accompanying drawings: Figure 1 is an elevation of a ring embodying my invention; Fig. 2 is an elevation of the preferred form of metal reinforcing ring; Fig. 3 is a section on line 3—3 of Fig. 1; Fig. 4 is similar section showing two metal rings and the duck insertion above referred to; Fig. 5 is a section on line 5—5 of Fig. 2; Fig. 6 is an elevation, partly in section, showing the rings assembled on the core.

Rings A of rubber or the like have keyways $a\ a$ and fit over core B which has keys $b\ b$ and journals $b'\ b'$, the keys $b\ b$ fitting and filling the key ways a a. Nuts D D are attached to the core and act as clamps when screwed up.

E E are layers of duck or the like inserted in the rubber rings and e e are similar narrower layers.

The above parts are substantially the same as those shown in my patent above referred to with the exception of the rubber rings which are made to receive metal reinforcing pieces F F, such pieces being preferably in the form of rings as shown.

The reinforcing rings shown in Figs. 2 and 5. are preferably made of malleable metal, and when used in rollers whose bodies have longitudinal ribs, they have recesses corresponding to the ribs on the core. These metal rings may be either tight or loose fit on the body; in the latter case where the rings are of loose fit on the core, when they are molded in the rubber rings, they are completely inclosed by the rubber, and there is nothing about the outside appearance of the rings to indicate that there are any metal rings in the sections. The fit of these sections on the body is, therefore, in this case, not metal to metal, but rubber to metal, the small amount of give in the rubber being sufficient to insure a snug fit, even if the body happened to be rusty or happened to be a trifle large or a trifle small. These reinforcing rings greatly reinforce, or strengthen the key-ways in the rubber, and absolutely prevent any such turning of the rubber rings about the metal body as might occur if the above duck insertion alone were used.

I do not limit myself to rings of cross section, as indicated by Figs. 2 and 5, as I may employ a ring of any other convenient cross section, and it is not absolutely necessary that recesses be provided in the metal rings, in fact when such metal rings are put into rubber sections, to be put on a metal body that has no ribs, then the metal rings would obviously have no recesses in them. I prefer to make these metal rings with holes, cavities, ribs, projections, etc., as shown by Figs. 2 and 5, so that they would have a firm grip on the rubber, independent of any adhesion of rubber to metal due to vulcanization, but in addition to this the rubber is firmly united to these metal or other rings by the process of vulcanization, as is well known in the art, so that the union which binds the metal or other rings to the rubber rings, in which they are inclosed, is very much greater than the bond between the metal rings and the rubber rings, when the metal rings are simply put in between the rubber rings and clamped there. These metal rings are put inside the rubber rings near the core and they do not extend far enough toward the outside of the rubber to interfere at all with the outside cushioning properties of the roller. In short, the effect of my reinforcing pieces is to greatly strengthen the inner portion of the rubber rings, without affecting the cushion of the surface, and the resulting roller section has the properties of a rubber ring so constructed that its inner portion while it has enough elasticity to make a snug fit on the core, yet has great strength and firmness to maintain its firm grip when clamped upon the core, and overcome the stretching and loosening tendency caused by heavy service. These rubber rings may be thus made with a great amount of elasticity, or resiliency on the surface, without detracting from the strength and firmness of the inside portion of the rings.

It will be observed that my ring of metal being T-shaped in cross section provides a large bearing surface at the outside and provides shoulders at the inside of the rim of the metal ring so that the roll is reinforced by material which gives strength but which will not cut into or harm the rubber.

While I have shown layers of duck inserted to give strength to the inner portion of the rubber ring and such layers are desirable in addition to my new metal, or other hard insertion, yet my invention consists in the discovery that a ring of metal or other hard material T-shaped in cross-section to provide a radial web and an enlarged rim wider than the web and thereby give a broad bearing surface at the outside of the rim and rubber-engaging shoulders at the inside of the rim, can be availed of in rubber or similar rolls without in any way interfering with those attributes of the rubber ring which are essential to adapt it for use in a rubber roller or for any other purpose for which it may be found useful as it is evident that my new reinforced ring will be found useful for other purposes besides rollers.

What I claim is:

1. An article of the character described comprising a ring of rubber and a ring of metal the former being formed around the latter which is T-shaped in cross-section to provide a radial web and an enlarged rim wider than the web to give a broad bearing surface at the outside of the rim and rubber-engaging shoulders at the inside of the rim.

2. An article of the character described comprising a ring of rubber and a ring of metal the former being formed around the latter which is T-shaped in cross-section to provide a radial web having perforations through which the rubber extends to bind metal and rubber together and to provide an enlarged rim wider than the web to give a broad bearing surface at the outside of the rim and rubber-engaging shoulders at the inside of the rim.

3. An article of the character described comprising a ring of rubber and a ring of metal the former being formed around the latter which is T-shaped in cross-section to provide a radial web having lateral wings to prevent turning of the rubber with relation to the metal and to provide an enlarged rim wider than the web to give a broad bearing surface at the outside of the rim and rubber-engaging shoulders at the inside of the rim.

JAMES BENNETT FORSYTH.

Witnesses:
R. B. ADAMS,
G. A. ROCKWELL.